United States Patent
Vickers

[15] 3,705,492
[45] Dec. 12, 1972

[54] REGENERATIVE GAS TURBINE SYSTEM

[72] Inventor: Paul T. Vickers, Royal Oak, Mich.

[73] Assignee: General Motors Corporation, Detroit, Mich.

[22] Filed: Jan. 11, 1971

[21] Appl. No.: 105,469

[52] U.S. Cl. ............................. 60/39.51 R, 60/39.65
[51] Int. Cl. ................................................. F02c 7/10
[58] Field of Search ....... 60/39.51 R, 39.51 H, 39.65, 60/39.66

[56] References Cited

UNITED STATES PATENTS

| | | | |
|---|---|---|---|
| 2,659,201 | 11/1953 | Krejci | 60/39.65 |
| 3,064,425 | 11/1962 | Hayes | 60/39.65 |

FOREIGN PATENTS OR APPLICATIONS

| | | | |
|---|---|---|---|
| 586,602 | 3/1947 | Great Britain | 60/39.51 R |
| 836,135 | 6/1960 | Great Britain | 60/39.51 R |

Primary Examiner—Carlton R. Croyle
Assistant Examiner—Warren Olsen
Attorney—Paul Fitzpatrick and Jean L. Carpenter

[57] ABSTRACT

A regenerative gas turbine engine with combustion apparatus including a combustion liner has the compressor connected to the combustion apparatus so as to supply primarily air unheated by the regenerator to the combustion zone of the liner and primarily air heated by the regenerator to the dilution zone of the liner, to reduce generation of oxides of nitrogen. The heated air also is used as film cooling air flowing along the inner surface of the combustion liner wall.

3 Claims, 1 Drawing Figure

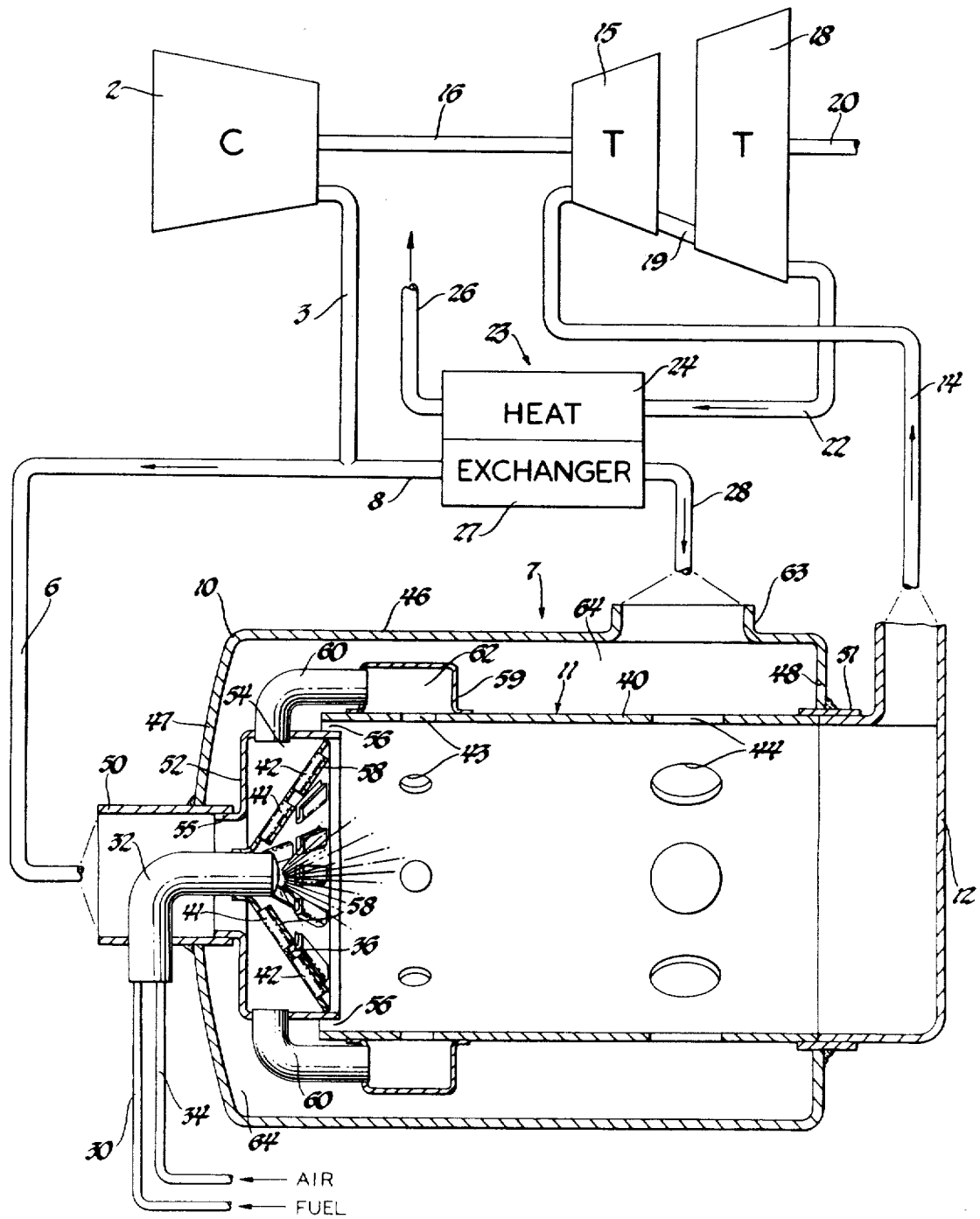

REGENERATIVE GAS TURBINE SYSTEM

My invention is directed to regenerative gas turbine engines, and particularly to improving the cleanness of combustion of such engines.

Since gas turbines are continuous combustion engines and ordinarily supply a considerable excess of air over stoichiometric to the combustion apparatus, they are naturally capable of cleaner combustion; that is, of an exhaust having less of constituents which may be considered pollutants, than engines of intermittent combustion types, particularly intermittent combustion engines operating at or near stoichiometric fuel to air ratios.

However, the combustion apparatuses of gas turbine engines ordinarily operate by burning the fuel in what is termed the combustion zone of the combustion apparatus, in which the fuel is atomized and burned in a minor portion of the air. Downstream in the flow through the combustion apparatus, in what is called the dilution zone, additional air is introduced and mixed with the combustion products to cool them and produce the turbine motive fluid. It has not appeared feasible, for various reasons which need not be gone into here, to distribute the fuel through the entire body of air flowing through the engine and thus achieve combustion at a low fuel to air ratio.

Experience has shown that the continuous flow gas turbine combustion apparatus provides an engine exhaust almost entirely free of carbon monoxide and unburned fuel or fuel constituents. However, the high temperature of combustion causes some formation of nitrogen oxides by combination of the nitrogen and oxygen present in the air supplied to the engine. The higher the temperature in the combustion zone, the greater the tendency for formation of nitrogen oxides.

This problem is accentuated when the engine includes a regenerator or recuperator or, in other words, a heat exchanger by which heat is transferred from the engine exhaust to the air flowing from the engine compressor to the combustion apparatus. The heat exchanger, which will be referred to hereafter as a regenerator, is a practical necessity in some applications as a means to improve the fuel economy of the engine. However, since the regenerator raises the temperature of the air entering the combustion apparatus, the problem of nitrogen oxide formation is aggravated.

My invention is based upon the concept that the air flowing to the combustion apparatus should be divided and most or all of the air for direct combustion; that is, the primary combustion air, should by-pass the regenerator so as to remain relatively cool; and that the remainder of the air flowing through the engine be passed through the heat exchanger and then be supplied to the combustion apparatus for dilution purposes, and also preferably for cooling the combustion liner. While this can be shown to result in some lowering of thermal efficiency of fuel economy of the engine, it is a way to lower percentages of nitrogen oxide because of the lower maximum temperature in the combustion zone. The fuel consumption is much the same, and the cooler combustion air does not rise to so high a temperature in the flame.

A feature of the invention is combustion chamber structure particularly adapted to channel the heated and unheated compressed air to the desired parts or air inlets of the combustion liner.

The general nature of my invention should be apparent from the foregoing, but it will be made more clear to those skilled in the art from the succeeding detailed description and accompanying drawing of the preferred embodiment of the invention.

The principal objects of my invention are to minimize undesirable constituents in the exhaust of a gas turbine engine, to lower the maximum temperature in the combustion zone of a regenerative gas turbine combustion apparatus, to improve the cleanness of the exhaust of a gas turbine engine without undue sacrifice of operating efficiency of the engine, and to provide a simple and effective arrangement for dividing the air flow from the compressor of a gas turbine engine between a first path directly into the primary combustion zone and a second path through a regenerative heat exchanger primarily into the dilution zone of the combustion apparatus of the engine.

Referring to the drawings, the FIGURE is a schematic diagram of a regenerative gas turbine engine incorporating the invention, including a sectional view of a combustion apparatus embodying the principles of the invention, the combustion apparatus being relatively enlarged.

The drawing, except for the improvement which forms the subject matter of my invention, illustrates a typical regenerative gas turbine engine of the free turbine type. The engine includes an air compressor 2 which discharges through a compressed air conduit 3 which has one branch compressed air conduit 6 leading directly to combustion apparatus 7 and a second branch compressed air conduit 8. The combustion apparatus 7 includes an outer case 10 and a combustion liner or flame tube 11, the combustion liner being enclosed within the outer case for flow of air from within the case into the liner. The combustion liner includes an outlet or transition portion 12 from which combustion products are discharged from the combustion apparatus through a conduit 14 into a first or high pressure turbine 15. Turbine 15 drives the compressor 2 through a shaft 16.

The exhaust from turbine 15 is supplied to a second or low pressure turbine 18. While ordinarily these two turbines are integrated structurally, they are illustrated here as being connected through a combustion products conduit 19. The turbine 18 drives a shaft 20 which may be connected to drive any load including, for example, the driving wheels of a self-propelled vehicle. The two turbines may be mechanically coupled together, or a single turbine driving shafts 16 and 20 may be used. The low pressure exhaust from turbine 18 is conducted through suitable ducting 22 to a heat exchanger 23 where the exhaust gas flows through one pass 24 of the heat exchanger, to an atmospheric exhaust 26. The heat exchanger may be of any suitable type such, for example, as a rotary regenerator or a fixed recuperator. As employed in a gas turbine engine, its purpose is to recover heat from the hot low pressure exhaust gases and heat the compressed air flowing from the compressor to the combustion apparatus so as to reduce the fuel consumption required to provide the high temperature motive fluid.

The second compressed air conduit 8, previously referred to, leads to a compressed air pass 27 of the heat exchanger 23 from which the heated compressed air flows through a conduit 28 to the combustion apparatus 7.

Fuel from a suitable source of fuel under pressure and suitably controlled is led through a fuel line 30 to a fuel spray nozzle 32 at the upstream end of the combustion liner 11. The nozzle 32 may be of an air-assisted atomization type to which compressed air is supplied through a line 34. Such a nozzle is illustrated in Grundman U.S. Pat. No. 3,310,240, Mar. 21, 1967. A fuel supply system is disclosed in Flanigan et al U.S. Pat. No. 2,976,683, Mar. 28, 1961.

The combustion apparatus 7, except as pointed out below, is of a well-known type in which the case 10 contains the compressed air, which is diffused and flows at relatively low velocity within the case, then flowing through openings in the combustion liner 11 to the interior of the liner. Fuel is sprayed into the air within the liner by the nozzle 32, is burned, and the resulting combustion products are discharged through the outlet portion 12 of the combustion apparatus. The liner 11 includes a dome 36 and a preferably cylindrical side wall 40. The forward part of the liner, which may correspond approximately to the first half of its length from the dome 36, may be considered the primary combustion zone of the liner within which fuel is burned. The remaining or downstream portion of the liner constitutes the dilution zone.

The dome 36 and side wall 40 of the liner may be connected by suitable means to admit film cooling air to flow along the inner surface of the liner, as is well known. Means for admission of primary or combustion air to the combustion zone of the liner is indicated by swirl ports 41 and 42 in the dome and ports 43 in wall 40. A ring of large air ports 44 in the wall 40 serve to admit dilution air to the downstream portion of the combustion liner. Such combustion liner structure is well understood by those skilled in the art and will not be further described here. Mention may be made of the following U.S. patents which disclose combustion apparatus having combustion liners of the general type referred to: Gaubatz, U.S. Pat. No. 2,699,040, Jan. 11, 1955; Dougherty, U.S. Pat. No. 2,748,567, June 5, 1956; Hayes U.S. Pat. No. 2,768,497, Oct. 30, 1956; Tomlinson, U.S. Pat. No. 3,064,424, Nov. 20, 1962; and Hayes, U.S. Pat. No. 3,064,425, Nov. 20, 1962. It will be understood that these patents show combustion apparatus with plural liners, but this does not affect the basic structure of the liner or the principles of operation of the combustion apparatus. Attention is also invited to Amann et al. U.S. Pat. No. 3,116,605, Jan. 7, 1964, and Collman et al. U.S. Pat. No. 3,267,674, Aug. 23, 1966, which structurally disclose regenerative gas turbine engines of the type illustrated schematically in FIG. 1, and also show combustion apparatus of the type referred to, apart from the structure to carry out my invention.

As will be apparent from what has been said above, my invention relates to the arrangement for conducting the air from the compressor and heat exchanger to the combustion apparatus, particularly the combustion liner; and to structure of the combustion apparatus. This may be expressed concisely as follows: A portion of the output of compressor 2 is directed through the first conduit 6 primarily as combustion air for the combustion apparatus and the remainder of the compressor output is directed through the heat exchanger and conduit 28 primarily to serve as dilution air and preferably also as film cooling air in the combustion apparatus. This will be explained with respect to the exemplary combustion apparatus illustrated in the lower part of the FIGURE which differs from conventional gas turbine combustion apparatus in the provision of the two inlets for air and in provision for directing the air entering through the two inlets to the desired portions of the combustion liner within which combustion of the fuel and dilution of the combustion products take place.

Referring to the drawing, the combustion chamber case or housing is illustrated as a generally cylindrical structure, although it may have any suitable outline and may be an enclosure defined by the frame of the engine. The case 10, as illustrated, has a cylindrical side wall 46, a front end wall 47, and a rear end wall 48. A sleeve 50 projecting from the front end wall and which may be integral with it provides a mounting for the fuel nozzle 32 and receives the schematically illustrated unheated compressed air conduit 6. The rear end wall 48 surrounds an annular flange 51 fixed to the wall which receives the schematically illustrated transition portion 12 leading into the combustion products conduit 14. The combustion liner side wall 40 is piloted at its downstream end within the flange 51. The combustion liner dome 36 has welded or otherwise fixed to it a cover 52 which defines with the dome an air space 54. The cover 52 includes a pilot 55 received within the sleeve 50. The dome 36 is fixed to the side wall 40 by suitable means which leave between them an annular gap 56 for film cooling air which flows through the gap due to the pressure drop from the outside to the inside of the combustion liner and flows along the inner surface of wall 40 to isolate it from the hot combustion products and serves as a cooling medium for the liner. This film cooling air does not enter to any great extent into the combustion process but ultimately is mixed with the combustion products and thus is considered as dilution air. (Perhaps about one-seventh is combined with the fuel.) The dome wall 36 has an inner row of six air swirl ports 41 and an outer row of 12 air swirl ports 42 as illustrated, there being plates 58 fixed over these swirl ports so as to deflect the air in a circumferential direction around the axis of the dome. The air from the inner row of swirl ports is swirled in one direction and that from the outer row in the opposite direction in the preferred structure. This air, which is swirled over the dome, is thus supplied from the space 54 and is unheated air. It is considered to be primarily consumed in the combustion process. The primary ports 43 also supply air which is substantially entirely used to promote combustion.

The liner side wall 40 is modified by providing an annular hat section manifold 59 welded or otherwise sealingly fixed to the side wall 40 so as to enclose the outer ends of all the ports 43. The manifold 59 is entered by a suitable number of air pipes 60 of a right angle configuration which are welded to the front wall of manifold 59 and to the radially outer wall of cover 52 so as to place the air space 54 in communication with the air space 62 within the manifold 59. The structure of cover 52, pipes 60, and manifold 59 isolates the unregenerated air entering through the sleeve 50 from the regenerated air and directs it through the swirl ports 41 and 42 and the primary air ports 43.

Apart from the area isolated by the elements 52 and 59, the exterior of the combustion liner is exposed to the regenerated air which enters through duct 28. As illustrated, the duct 28 is fitted into a flange 63 extending from the side wall of case 10. It is thus in direct communication through the air plenum 64 between the case and the liner dome 36, with the dilution air ports 44, and with the annular gap 56 for the film cooling air.

Since, as stated above, by-passing the heat exchanger reduces to some extent the efficiency of the engine, it is not desirable to by-pass to an excessive extent. Thus, the unheated air is confined to the primary air ports 43 and the dome ports 41 and 42. In some cases it may be considered desirable to admit regenerated air through one or the other set of ports 41 or 42 rather than the unregenerated air. This may be done by suitable modification of the manifolding arrangement to exclude the unheated air from some or all of the ports 41 or 42.

The drawings illustrate a simple and effective arrangement for directing the air from the two conduits 6 and 28 to the desired zones of the combustion liner. Obviously, many arrangements for this purpose may be devised.

It will be seen that the arrangement according to my invention provides for conducting the greater portion of the air through the regenerator to the combustion apparatus and conducting a minor portion sufficient for combustion of the fuel through a circuit which by-passes the regenerator. The resulting lowering of the maximum temperature at the zone of combustion will very significantly reduce the production of nitrogen oxides in the combustion apparatus.

The detailed description of the preferred embodiment of the invention for the purpose of explaining the principles thereof is not to be considered as limiting or restricting the invention, as many modifications may be made by the exercise of skill in the art without departing from the spirit of the invention.

I claim:

1. A regenerative gas turbine engine comprising, in combination, air compressor means, a combustion apparatus supplied from the compressor means, turbine means energized from the combustion apparatus connected to drive the compressor means, a heat exchanger, and a turbine exhaust duct connected through one pass of the heat exchanger; the heat exchanger having a second pass in heat exchange relation to the first pass; a first compressed air conduit leading from the compressor means to the combustion apparatus by-passing the heat exchanger; a second compressed air conduit leading from the compressor means through the second pass of the heat exchanger to the combustion apparatus; the combustion apparatus comprising a case and a combustion liner mounted within the case having an outlet to the turbine means; the liner having a dome and means defining a side wall; the liner including inlet means for admitting combustion air through the dome and through the liner wall adjacent the dome and including entrance means for admitting dilution air through the wall; the combustion apparatus also including means for isolating the inlet means from the entrance means, the combustion apparatus including means to connect the first said air conduit to the inlet means and the second said air conduit to the entrance means.

2. A regenerative gas turbine engine comprising, in combination, air compressor means, a combustion apparatus supplied from the compressor means, turbine means energized from the combustion apparatus connected to drive the compressor means, a heat exchanger, and a turbine exhaust duct connected through one pass of the heat exchanger; the heat exchanger having a second pass in heat exchange relation to the first pass; a first compressed air conduit leading from the compressor means to the combustion apparatus by-passing the heat exchanger; a second compressed air conduit leading from the compressor means through the second pass of the heat exchanger to the combustion apparatus; the combustion apparatus comprising a case and a combustion liner mounted within the case having an outlet to the turbine means; the liner having a dome and means defining a side wall; the liner including inlet means for admitting combustion air through the dome and through the liner wall adjacent the dome and including entrance means for admitting film cooling air to flow along the inside of the wall and for admitting dilution air through the wall; the combustion apparatus also including means for isolating the inlet means from the entrance means, the combustion apparatus including means to connect the first said air conduit to the inlet means and the second said air conduit to the entrance means.

3. A regenerative gas turbine engine comprising, in combination, air compressor means, a combustion apparatus supplied from the compressor means, turbine means energized from the combustion apparatus connected to drive the compressor means, a heat exchanger, and a turbine exhaust duct connected through one pass of the heat exchanger; the heat exchanger having a second pass in heat exchange relation to the first pass; a first compressed air conduit leading from the compressor means to the combustion apparatus by-passing the heat exchanger; a second compressed air conduit leading from the compressor means through the second pass of the heat exchanger to the combustion apparatus; the combustion apparatus comprising a case and a combustion liner mounted within the case having an outlet to the turbine means; the liner having a dome and means defining a side wall; the liner including inlet means for admitting combustion air through the dome and through the liner wall adjacent the dome and including entrance means for admitting film cooling air to flow along the inside of the wall and for admitting dilution air through the wall; the combustion liner also including means for isolating the inlet means from the entrance means, the combustion liner including means to connect the first said air conduit to the inlet means and the case including means to connect the second said air conduit to the entrance means.

* * * * *